United States Patent
McNair et al.

(10) Patent No.: US 7,213,649 B2
(45) Date of Patent: May 8, 2007

(54) GEOTHERMAL PIPE WEIGHT

(76) Inventors: Edward F. McNair, 3147 R Ave., Adel, IA (US) 50003; Richard C. Burhans, 3072 Timber Trail, St. Charles, IA (US) 50240

( * ) Notice: Subject to any disclaimer, the term of this patent is extended or adjusted under 35 U.S.C. 154(b) by 292 days.

(21) Appl. No.: 10/810,933

(22) Filed: Mar. 26, 2004

(65) Prior Publication Data

US 2005/0211437 A1    Sep. 29, 2005

(51) Int. Cl.
*F28F 1/00* (2006.01)
*F25B 27/00* (2006.01)
*F28D 7/06* (2006.01)

(52) U.S. Cl. .................... 166/302; 166/380; 166/77.1; 166/242.3; 165/45; 62/260

(58) Field of Classification Search ............ 166/302, 166/385, 57, 71, 77.1, 242.3, 242.4; 165/45; 62/260
See application file for complete search history.

(56) References Cited

U.S. PATENT DOCUMENTS

| | | | | |
|---|---|---|---|---|
| 4,448,238 A | * | 5/1984 | Singleton et al. ............. 165/45 |
| 4,574,875 A | * | 3/1986 | Rawlings et al. ............. 165/45 |
| 4,909,323 A | * | 3/1990 | Hastings ................... 166/242.3 |
| 5,306,885 A | * | 4/1994 | Utke ........................... 200/338 |
| 5,533,356 A | * | 7/1996 | DeMasters ................... 62/260 |
| 5,590,715 A | * | 1/1997 | Amerman .................... 166/290 |
| 5,634,515 A | * | 6/1997 | Lambert ....................... 165/45 |
| 6,000,459 A | * | 12/1999 | Jeppesen ...................... 165/45 |
| 6,585,036 B2 | * | 7/2003 | Amerman et al. ............. 165/45 |
| 6,920,924 B2 | * | 7/2005 | Roesch et al. ................. 166/71 |
| 6,955,219 B2 | * | 10/2005 | Johnson, Jr. ................. 166/286 |

* cited by examiner

*Primary Examiner*—Kenneth Thompson
(74) *Attorney, Agent, or Firm*—Sturm & Fix LLP (57) ABSTRACT

A method and apparatus for adding rigidity and weight to the piping used in geothermal wells for ground-source heat pumps enhances insertion of the piping into the wells. The weight used must be approved by appropriate organizations such as the DNR, NSF, and/or EPA, or similar, for contact with the ground water. Concrete and coated iron or steel are examples of such weights. A system for assembling the pipes, weight, and a tremie pipe for insertion is disclosed. The weighting system may also help maintain straightness in the geothermal piping for ease of inserting the piping into the vertical well.

30 Claims, 8 Drawing Sheets

GEOTHERMAL PIPE WEIGHT

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to an apparatus for geothermal wells. More specifically, the present invention relates to a method and apparatus for providing weight and rigidity to the piping used in vertical wells drilled for ground-source heat pumps. The invention is used to aid in inserting the piping, along with a tremie pipe, into the well.

2. Background Art

Heat pumps typically exchange heat between an indoor space and the ambient. The coefficient of performance for both the heat pump cycle as well as the refrigeration cycle is usually significantly enhanced by using ground water for the ambient because the temperature of the ground water is fairly constant at temperatures often closer to the desired indoor space temperature than the outdoor air.

To make adequate contact with the ground water, vertical wells 200 to 300 feet deep are drilled into the ground in the neighborhood of the indoor space being heated and/or cooled.

A loop of piping made of a polymer such as SDR 11 virgin polyethylene resin is inserted into the drilled well. Two pipes are involved with an elbow connecting the two at their lowest extremity in the well. The well will be completely or partially filled with water, clay, mud, sand, etc., any of which impede the insertion of the piping loop. Besides the possibility of frictional resistance to insertion, the plastic, having a density less than water, is buoyant—even when filled with water. To overcome the frictional as well the buoyancy forces, additional weight must be included with the piping. Present practice includes the use of concrete reinforcing rod and junkyard scrap iron to increase the weight of the piping for insertion. None of these materials are approved by the appropriate state organizations such as the Department of Natural Resources (DNR), or equivalent, or the appropriate federal organizations such as the National Sanitation Federation (NSF) and the Environmental Protection Agency (EPA) for contact with ground water.

The piping products used in these geothermal installations are delivered in a roll. Because the piping material has "memory," it will retain some curvature during the insertion process, impeding the movement of the pipe into the well.

There is a need, therefore, for a system for adding weighting materials approved by the appropriate organizations (e.g. DNR, NSF, EPA, or equivalent) to the piping loops inserted into a geothermal well for a ground-source heat pump. There is additional need for a system for straightening and maintaining the straightness of the piping during the insertion of the piping into the well.

BRIEF SUMMARY OF THE INVENTION

Two problems present themselves when piping is inserted into a well for a ground-source heat pump system:
1. The pipe, even filled with water, is buoyant in the contents (mud, sand, water, etc.) of the well, and may require significant force to keep it from floating back out of the well.
2. The pipe, having been stored in a roll, retains some curvature making it difficult to insert into a straight-bored well.

Therefore, one object of the present invention is to provide a system whereby weight may be added to the piping before and during insertion into the well. An important and related object is to provide such extra weighting in a manner that is approved by the DNR, NSF, and/or EPA (or equivalent) for insertion into the ground water.

Another object of the present invention is to provide a system for straightening the pipe that is inserted into the well, and maintaining that straightness during the installation.

It is advantageous that any weight added to the geothermal well piping be as dense as possible. Examples of materials that may be used comprise iron, steel, and concrete. In a separate embodiment, straight pipes may be filled with dense material such as sand, then sealed at both ends.

Some materials, notably iron and steel, are not suitable for contact with ground water according to the states' DNR and/or the federal NSF and EPA. To make these materials useable for the present purpose, they must be sealed in a coating that will exclude water and remain intact indefinitely. Examples of such sealing materials are polyethylene and powder coatings. Concrete need not be coated, but if steel is used to enhance the tensile strength of the concrete, the steel must not come into contact with the ground water.

If pipes filled with sand are used, the piping material must be approved by the appropriate organizations such as the DNR, NSF, and/or EPA. The same materials used for ground-source heat pump pipe are suitable.

Insertion of the geothermal system piping into the vertical well is made more difficult due to the pipe's shape memory. Because such piping is delivered on rolls, the pipe tends to retain some curvature. If the pipe is stretched out in the sun on a warm day, the curvature may be reduced or even eliminated, but the pipe also loses rigidity, making it difficult to work with. The weights described above may be configured to provide the straightness and rigidity needed to insert the pipe into the well.

Weights may be made in sections for ease of handling. The sections must be stackable in a fashion that provides rigidity to their joints, thereby making the whole substantially rigid. The weights are constructed with any of a number of various interlocking ends. The weights are typically affixed to the geothermal piping with tape. Tape at or near the ends of each weight help ensure the rigidity of the connections.

Weights need only be added to a lower portion of the geothermal piping. Tape is wrapped around the weight and ground-source heat pump pipe every several feet. The tremie pipe is also taped, but only sufficiently to secure its travel into the well. The tremie pipe must be broken free to pull up when grouting the well.

Clamps may also be incorporated to expedite the process of attaching the pipes to the weights.

The novel features which are believed to be characteristic of this invention, both as to its organization and method of

3 operation together with further objectives and advantages thereto, will be better understood from the following description considered in connection with the accompanying drawings in which a presently preferred embodiment of the invention is illustrated by way of example.

DETAILED DESCRIPTION OF THE INVENTION

Figure 1:
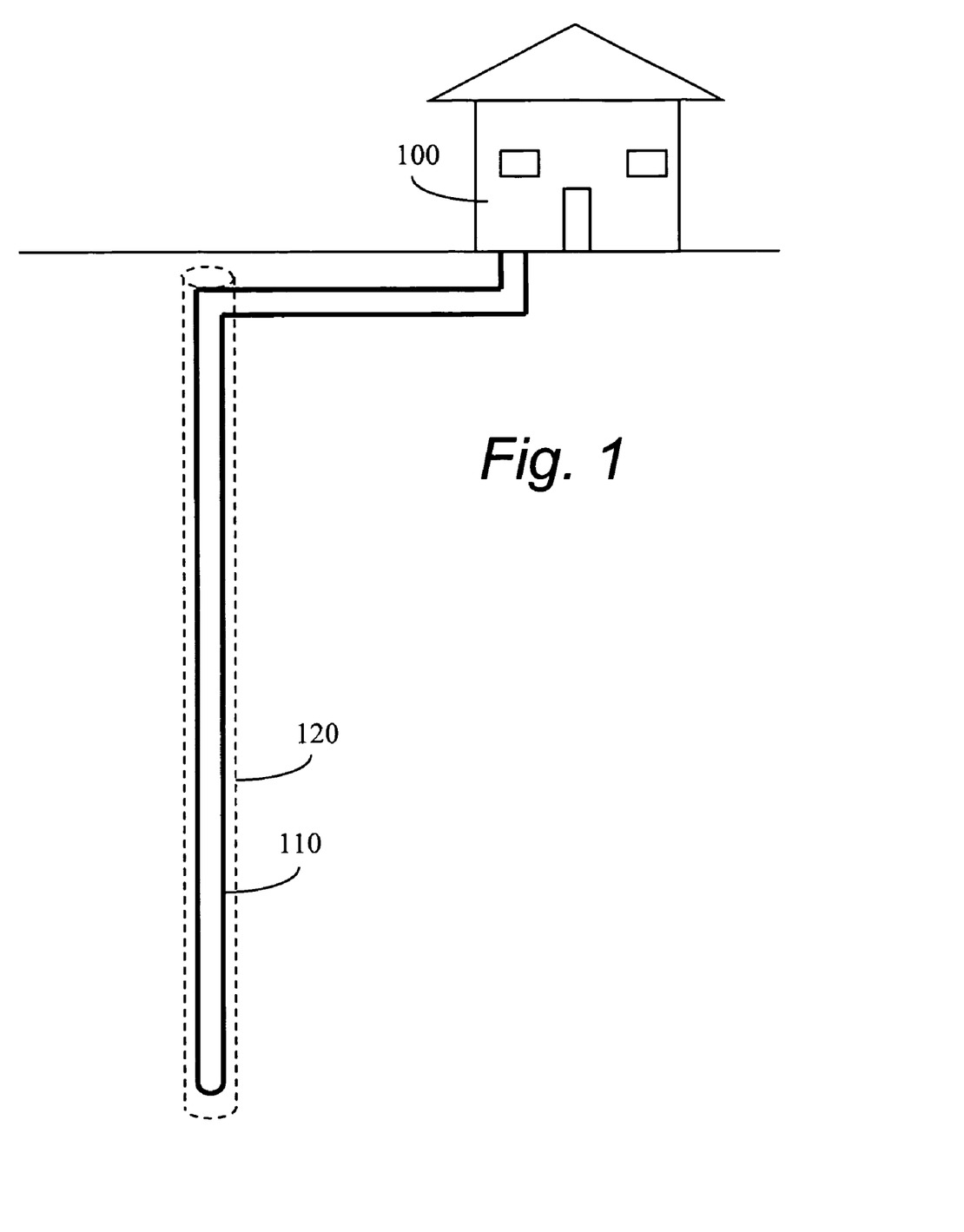
FIG. 1 is a schematic of a heated structure and a geothermal well with geothermal piping therein.

The indoor environment of a structure 100, shown in FIG. 1, is controlled. For heating as well as cooling, heat is exchanged with the ground and ground water via geothermal piping 110 that was inserted into a vertical geothermal well 120. The geothermal piping is connected to a ground-source heat pump (not shown). Water circulating in the geothermal piping 110, exchanges heat with a condenser within the ground-source heat pump for cooling duty or an evaporator within the ground-source heat pump for heating duty.

Figures 2, 3:
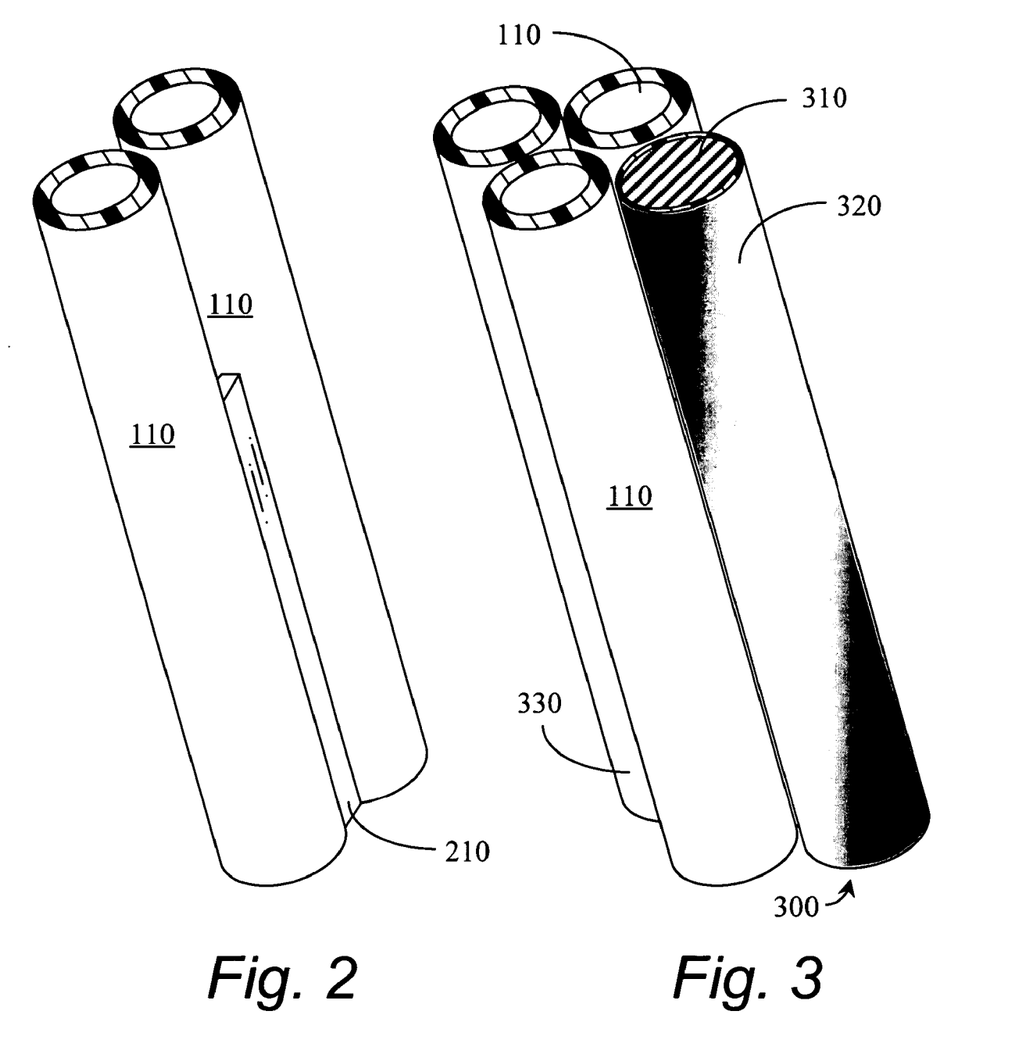
FIG. 2 is a perspective view of a section of ground-source heat pump piping with a web separating two such pipes.
FIG. 3 is a perspective view of the section of ground-source heat pump piping with a tremie pipe and weight attached.

An example of a section of some geothermal piping 110 for use with a ground-source heat pump is shown in FIG. 2. A web 210 connects the two pipes 110 and provides separation to reduce heat transfer between the two pipes.

4

Figure 13:
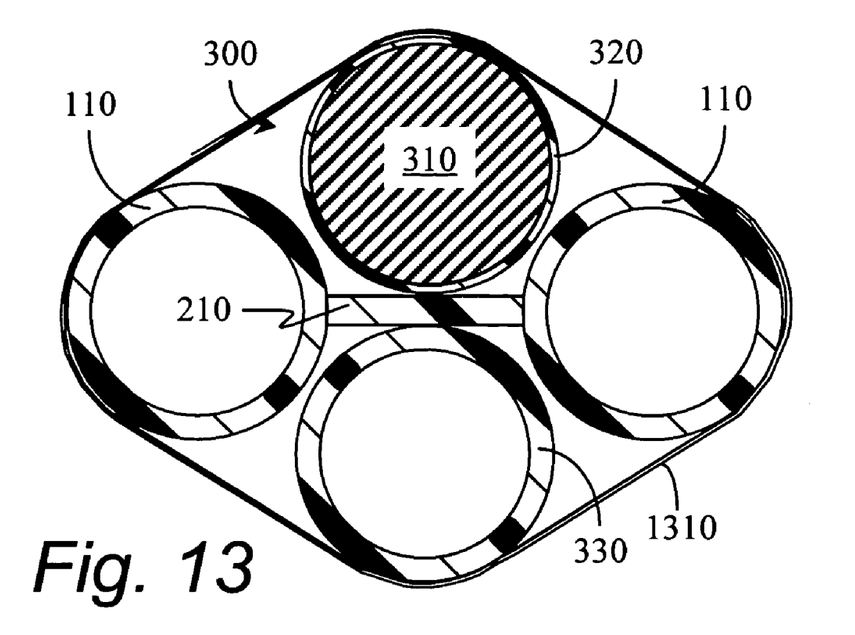
FIG. 13 is a section view of the ground-source heat pump piping showing two geothermal pipes, a tremie pipe, and a weight attached with tape.

The same geothermal pipes 110 as shown in FIG. 2 are shown in FIG. 3 along with a weight 300 and a tremie pipe 330. The weight 300 comprises a heavy core 310 that may be made of steel, iron, or concrete, and a water impervious coating 320 such as polyethylene. Such a coating 320 makes the weight approvable by the appropriate organizations such as the DNR, NSF and/or EPA (or equivalent) for contact with ground water. No coating 320 may be necessary for some core 310 materials such as concrete. The cross section of the weight 300 shown in FIG. 3 is circular, but the present invention is not limited to any particular cross sectional shape. All these components, the two geothermal pipes 110 (whether separated by a web 210 or not), a weight 300 and the tremie pipe 330 are typically bound together using tape 1310 such as duct tape or electrical tape or similar as shown in FIG. 13.

Figure 4:
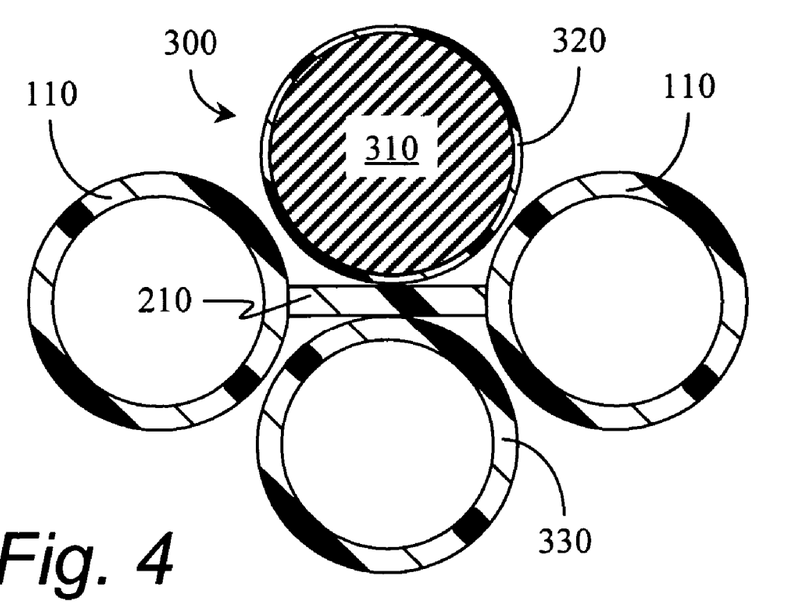
FIG. 4 is a section view of the ground-source heat pump piping with a web separating two such pipes and a tremie pipe and weight attached.

The geothermal pipes 110, tremie pipe 330 and weight 300 are shown in plan view in FIG. 4. The web 210, again, separates the two geothermal pipes 110.

Figure 5:
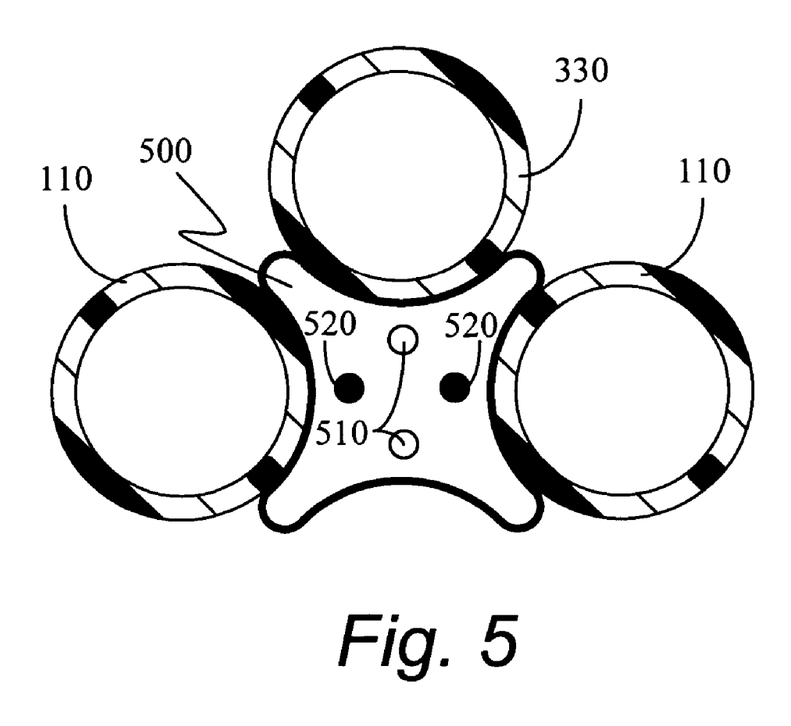
FIG. 5 is a section view of a specially shaped weight with ground-source heat pump piping and a tremie pipe attached.
Figures 6A, 6B:
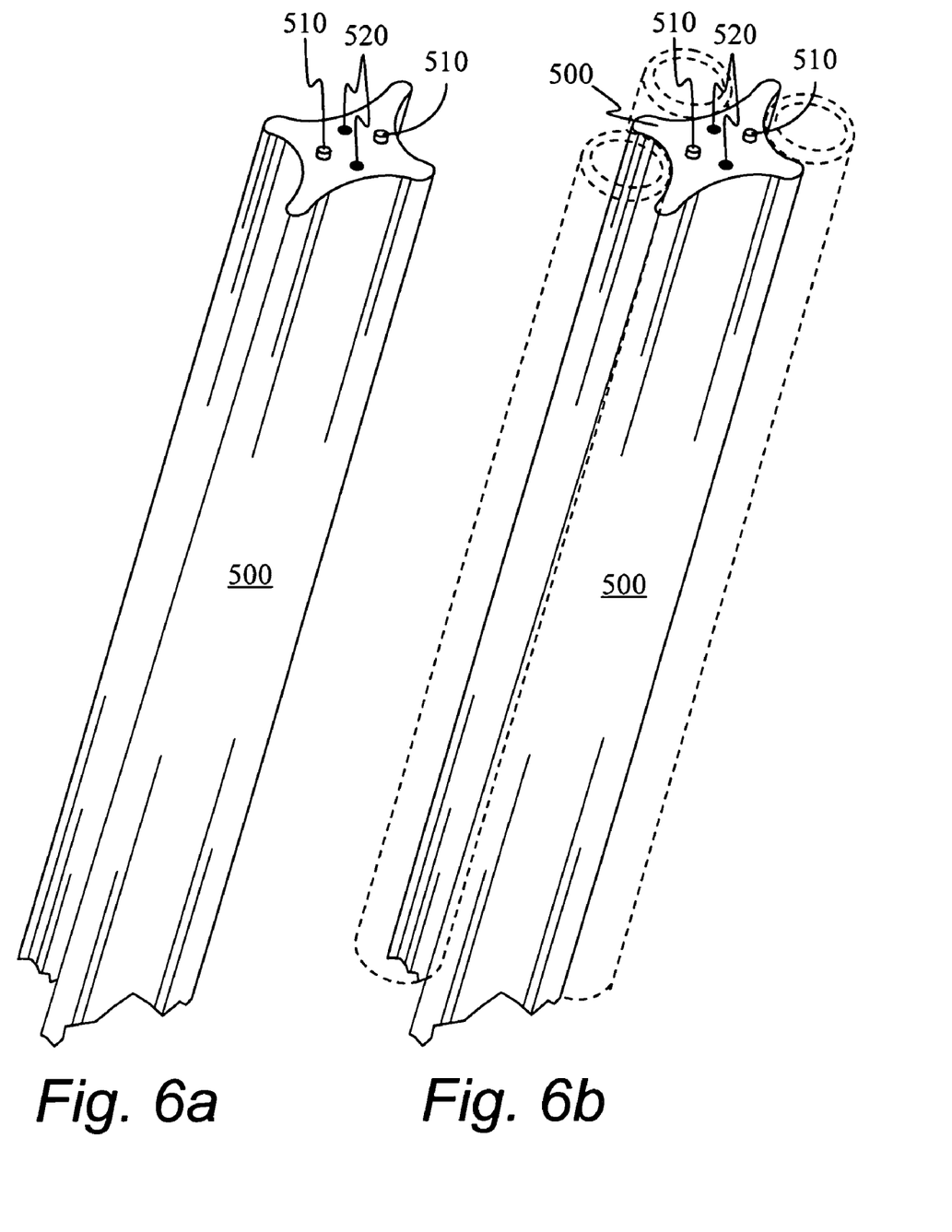
FIG. 6a is a perspective view of the specially shaped weight of the present invention.
FIG. 6b is a perspective view of the specially shaped weight ground-source heat pump piping and a tremie pipe attached.
Figure 7:
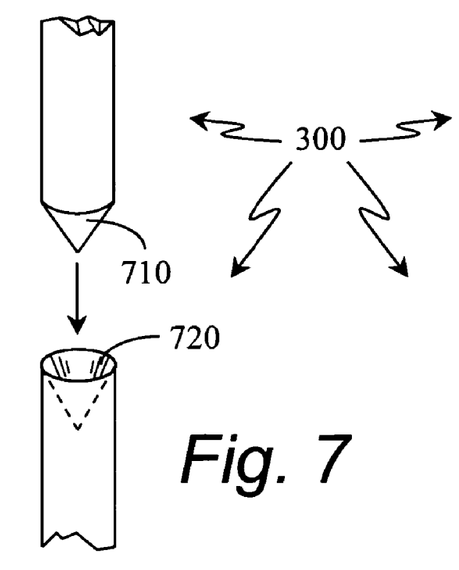
FIG. 7 is a side elevation view of solid geothermal pipe weights having cone-shaped interlocking ends.

A second embodiment of the present invention is shown in plan view in FIG. 5 and perspective views in FIGS. 6a and 6b. In this case, the weight 500 has a special cross sectional shape to receive the geothermal pipes 110 and the tremie pipe 330. To define the cross sectional shape of the weight 500, we begin with a substantially square rectangle with rounded corners. Each of the four substantially equal sides is curved inward, toward the center of the rectangle in substantially circular arc shapes to receive the geothermal pipes 110 and tremie pipe 330. The shape described and illustrated is hereby defined as a modified receptive square.

Figure 14:
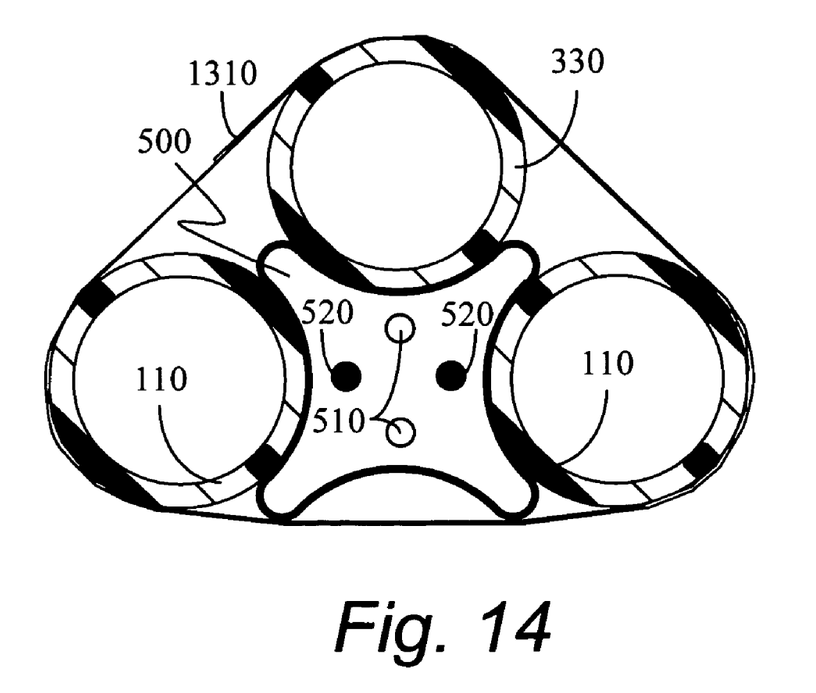
FIG. 14 is a section view of a specially shaped weight with geothermal piping and a tremie pipe attached with tape.

In this embodiment, the geothermal pipes 110 are not separated by a web. These special weights 500 are stacked end to end in use and coupled by mating pins 510 with sockets 520. The special weight 500 is shown in FIG. 6a with no attached piping, while in FIG. 6b, the geothermal pipes 110 and the tremie pipe 330 are shown in dashed lines in position on the special weight 500. The piping, both the geothermal pipe and the tremie pipe may be attached to the special weight 500 using tape 1310 as shown in FIG. 14 or by clamps 1510 illustrated in FIG. 15. The clamps 1510 may be flexible or rigid. Therefore, the clamps 1510 may be made of plastic or cast into the special weight 500, for instance.

Figure 8:
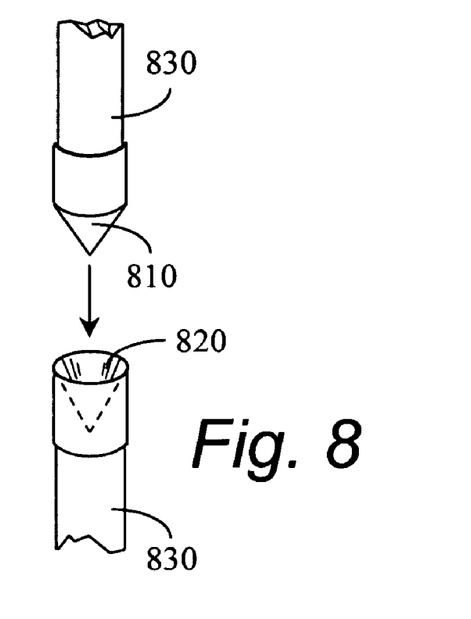
FIG. 8 is a side elevation view of filled pipe type geothermal pipe weights having cone-shaped interlocking ends.

It is important that, whatever form the weights 300, 500 take, they may be coupled end to end such that some rigidity is imparted to the geothermal pipes 110. Some examples of such end couplings are illustrated in FIGS. 7–10 for the first embodiment of the weight 300. A conical insert 710 is inserted into a matched conical socket 720 in FIG. 7. The weights 300 depicted in FIG. 7 have a ferrous material core 310 such as steel or cast iron coated with a water impervious coating 320 such as polyethylene; or the weights may be made of concrete with no coating. FIG. 8 depicts a weight 300 constructed by filling a DNR, NSF, and/or EPA (or similar) approved pipe 830 with sand or other dense material. The insert 810 and socket 820 are fittings—threaded or glued onto the pipe 830.

Figure 9:
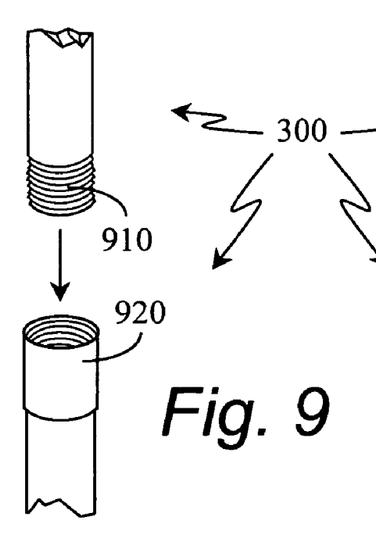
FIG. 9 is a side elevation view of geothermal pipe weights having threaded interlocking ends.

A system for threading the weights 300 together is shown in FIG. 9. A male thread 910 is provided at one end of the weight 300 while a female bushing 920 is used at the other end of the weight 300.

Figure 10:
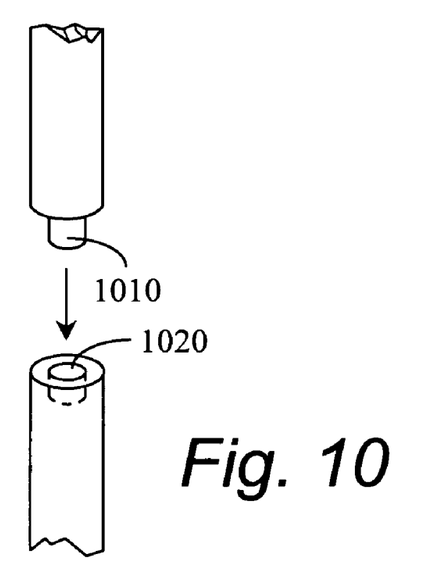
FIG. 10 is a side elevation view of geothermal pipe weights having pin and socket interlocking ends.

A right circular cylindrical shaped peg 1010 with a right circular cylindrical shaped socket 1020 provide coupling in FIG. 10. The coupling systems shown in FIGS. 9 and 10 may be used with either a solid weight 300 such as ferrous material/coated version or a filled pipe 830 version.

Figures 11, 15:
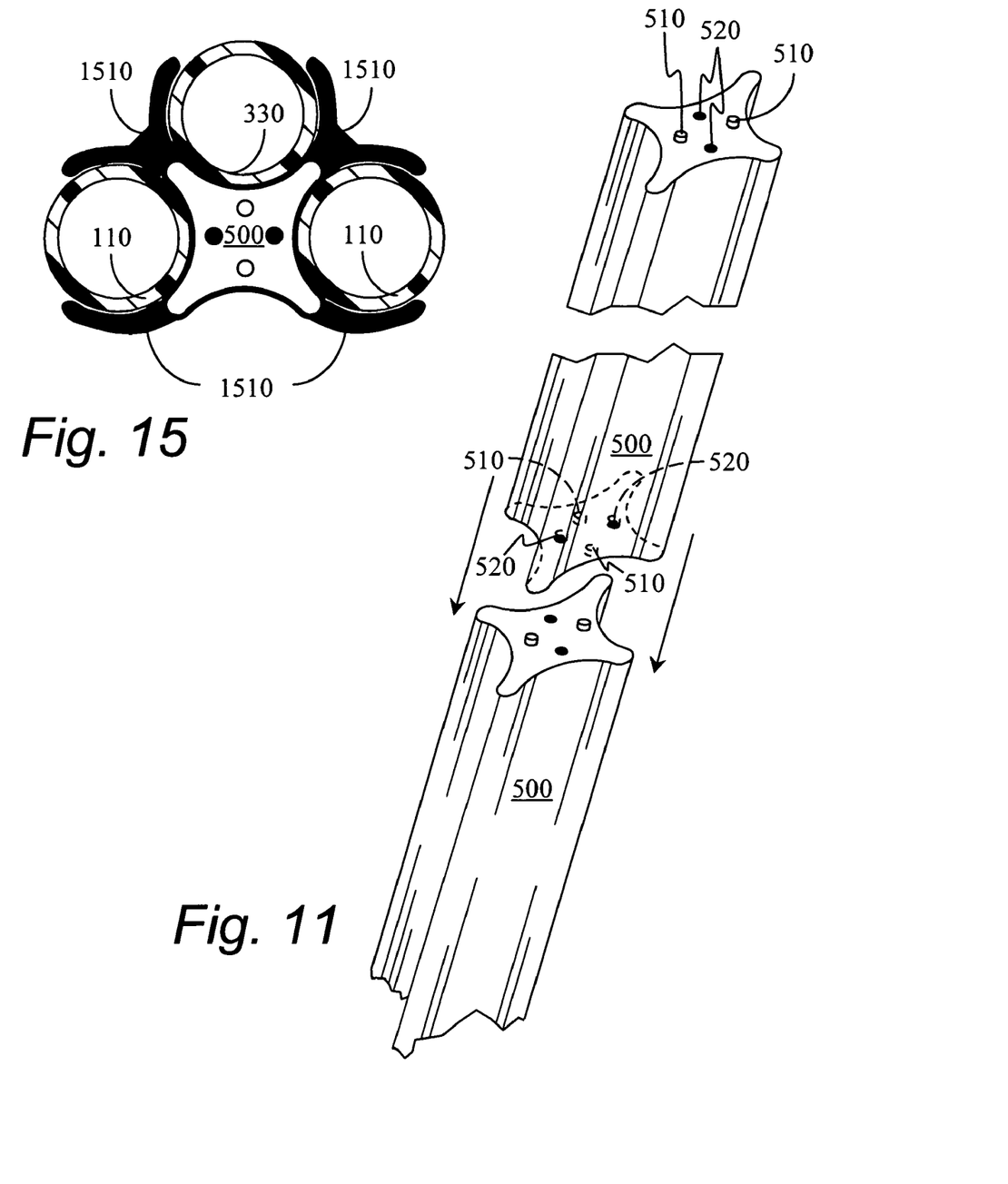
FIG. 11 is a perspective view of specially shaped weights with pin and socket interlocking ends.
FIG. 15 is a section view of a specially shaped weight with geothermal piping and a tremie pipe attached with clamps.

The second embodiment of the present invention is shown in perspective in FIG. 11 illustrating the coupling of two special weights 500. The cross section of the special weight 500 is symmetric about a line passing through the centers of the pegs 510 and also about a line passing through the centers of the sockets 520. Therefore, by rotating the special weight 500 90° on its longitudinal axis, the pins 510 may always be aligned with the sockets 520.

Figure 12:
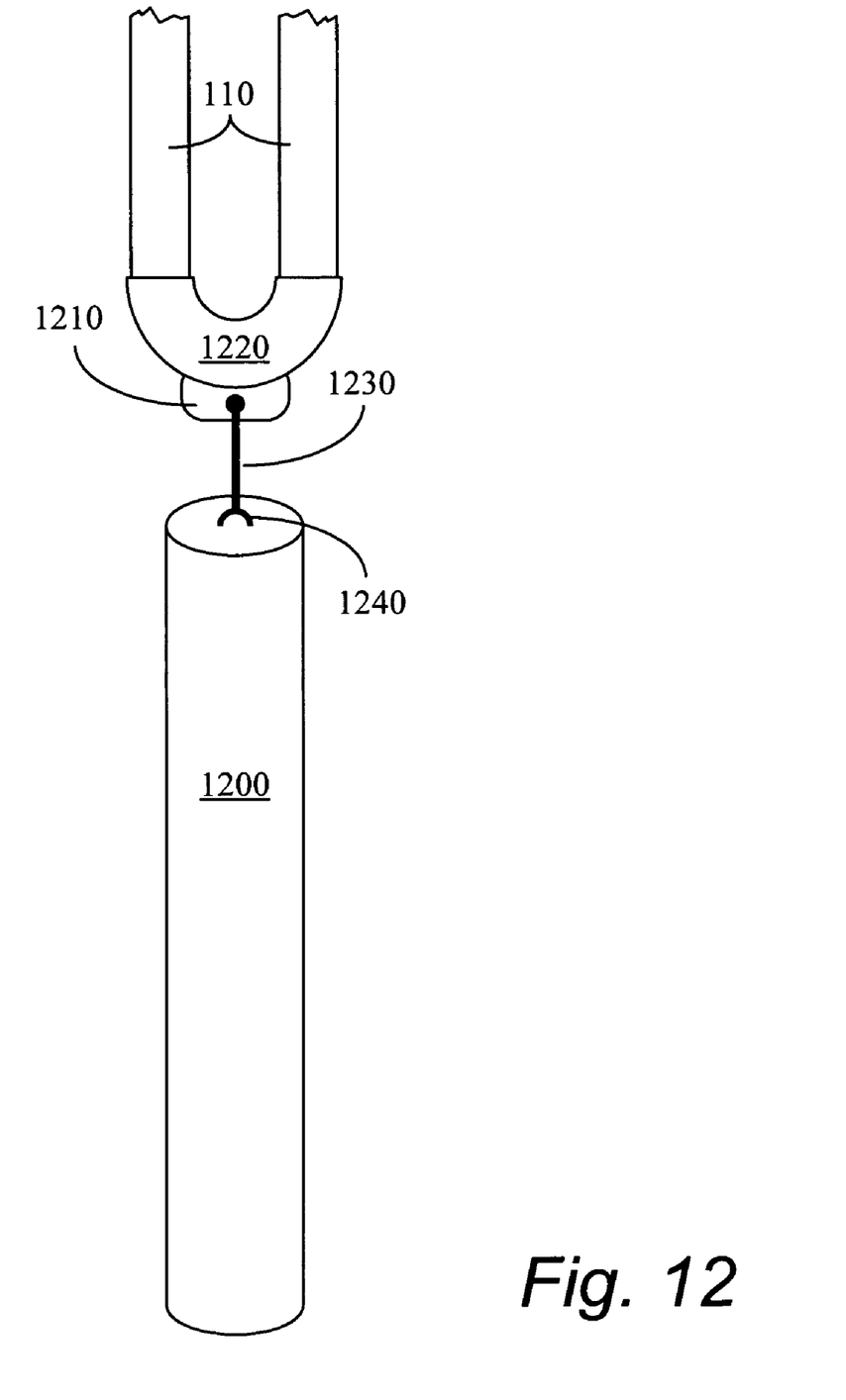
FIG. 12 is a side elevation of a further embodiment of the present invention wherein the weight hangs beneath the geothermal piping.

A third embodiment of the present invention is shown in FIG. 12. A weight 1200 hangs from a hanger 1210 attached to an elbow 1220 at the bottom of the geothermal pipes 110. A rope or coated metallic wire or cable is used to attach the weight 1200 to the hanger 1210 via a loop 1240 made fast to the concrete weight. The loop is also made of rope or coated metallic wire or cable. The weight may, again, be made of steel or iron coated with a water impervious material to be approved by the DNR, NSF and/or EPA (or equivalent); or it may be of concrete, which does not need a coating.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

We claim:

1. A method for providing added weight to geothermal piping for insertion in a vertical geothermal well, the weight comprising a material having a density greater than fluidic material found in the vertical geothermal well and a material that is approved by appropriate organizations for non-contaminating contact with potable ground water, the method comprising affixing the weight to an outside of the geothermal piping wherein the weight comprises:
   (a) a ferrous material; and
   (b) a coating over an entire surface of the weight comprising a water impervious material.

2. The method of claim 1 wherein the water impervious material comprises polyethylene.

3. The method of claim 1 wherein the water impervious material comprises a powder coating.

4. The method of claim 1 wherein the ferrous material comprises steel.

5. The method of claim 1 wherein the ferrous material comprises cast iron.

6. The method of claim 1 wherein the step of affixing the weight to the piping comprises taping the weight to the geothermal piping in a plurality of locations.

7. The method of claim 1 wherein the step of affixing the weight to the piping comprises clamping the piping to the weight with clamps.

8. A method for providing added weight to geothermal piping for insertion in a vertical geothermal well, the weight comprising a material having a density greater than fluidic material found in the vertical geothermal well and a material that is approved by appropriate organizations for non-contaminating contact with potable around water, the method comprising affixing the weight to an outside of the geothermal piping wherein the weight comprises a vessel filled with sand.

9. The method of claim 8 wherein the vessel is a pipe.

10. A method for providing added weight to geothermal piping for insertion in a vertical geothermal well, the weight comprising a material having a density greater than fluidic material found in the vertical geothermal well and a material that is approved by appropriate organizations for non-contaminating contact with potable ground water, the method comprising affixing the weight to an outside of the geothermal piping wherein a plurality of weights are stackable, end to end.

11. The method of claim 10 including the step of coupling the weights together such that rigidity of the geothermal piping is enhanced.

12. A method for providing added weight to geothermal piping for insertion in a vertical geothermal well, the weight comprising a material having a density greater than fluidic material found in the vertical geothermal well and a material that is approved by appropriate organizations for non-contaminating contact with potable ground water, the method comprising affixing the weight to an outside of the geothermal piping wherein said weight is elongated and has a cross sectional shape of a modified receptive square.

13. The method of claim 12 additionally comprising the steps of:
   (a) affixing the geothermal piping to first and second sides of the modified receptive square; and
   (b) affixing a tremie pipe to a third side.

14. The method of claim 13 wherein the first and second sides are opposite one another on the modified receptive square.

15. The method of claim 14 wherein, considering cross sectional shape of a modified receptive square, two pegs lie on a first line of symmetry, said pegs being symmetric about a second line of symmetry and two sockets, sized to receive said pegs, lie on the second line of symmetry, said sockets being symmetric about the first line of symmetry.

16. The method of claim 15 wherein a plurality of weights are stacked end to end, the method additionally comprising the steps of:
   (a) engaging the pegs from an end of a first weight into the sockets in an end of a second weight; and
   (b) engaging the pegs from the end of the second weight into the sockets in the end of the first weight.

17. A method for providing added weight to geothermal piping for insertion in a vertical geothermal well, the weight comprising a material having a density greater than fluidic material found in the vertical geothermal well and a material that is approved by appropriate organizations for non-contaminating contact with potable ground water, the method comprising affixing the weight to an outside of the geothermal piping wherein the step of affixing the weight comprises hanging the weight below an elbow at a bottom of the geothermal piping.

18. An apparatus for providing added weight to geothermal piping for insertion in a vertical geothermal well, the apparatus comprising an elongated member comprising a material denser than fluidic material found in the vertical geothermal well and a material being approved by appropriate organizations for non-contaminating contact with potable ground water wherein the material denser than the material found in the vertical geothermal well is a ferrous material and the material that is approved by appropriate organizations for contact with ground water comprises a coating over an entire surface of the ferrous material, said coating comprising a water impervious material.

19. The apparatus of claim 18 wherein the water impervious material comprises polyethylene.

20. The apparatus of claim 18 wherein the water impervious material comprises a powder coating.

21. The apparatus of claim 18 wherein the ferrous material comprises steel.

22. The apparatus of claim 18 wherein the ferrous material comprises cast iron.

23. An apparatus for providing added weight to geothermal piping for insertion in a vertical geothermal well, the apparatus comprising an elongated member comprising a material denser than fluidic material found in the vertical geothermal well and a material being approved by appropriate organizations for non-contaminating contact with potable ground water additionally comprising:
 (a) a plurality of weights; and
 (b) couplings at each end of each weight for stacking the plurality of weights end to end.

24. The apparatus of claim 23 including means to couple the plurality of weights together to enhance rigidity of the geothermal piping.

25. An apparatus for providing added weight to geothermal piping for insertion in a vertical geothermal well, the apparatus comprising an elongated member comprising a material denser than fluidic material found in the vertical geothermal well and a material being approved by appropriate organizations for non-contaminating contact with potable ground water wherein said elongated member has a cross sectional shape of a modified receptive square.

26. The apparatus of claim 25 additionally comprising:
 (a) means for affixing the geothermal piping to first and second sides of the modified receptive square; and
 (b) means for affixing a tremie pipe to a third side.

27. The apparatus of claim 26 wherein the first and second sides are opposite one another on the modified receptive square.

28. The apparatus of claim 27 wherein, considering the cross sectional shape of a modified receptive square, the apparatus additionally comprises:
 (a) two pegs lying on a first line of symmetry, said pegs being symmetric about a second line of symmetry; and
 (b) two sockets, sized to receive said pegs, lying on the second line of symmetry, said sockets being symmetric about the first line of symmetry.

29. The apparatus of claim 28 wherein a plurality of weights are stacked end to end, the apparatus additionally comprising:
 (a) means for engaging the pegs from an end of a first weight into the sockets in an end of a second weight; and
 (b) means for engaging the pegs from the end of the second weight into the sockets in the end of the first weight.

30. An apparatus for providing added weight to geothermal piping for insertion in a vertical geothermal well, the apparatus comprising an elongated member comprising a material denser than fluidic material found in the vertical geothermal well and a material being approved by appropriate organizations for non-contaminating contact with potable ground water additionally comprising a hanger for hanging the weight below an elbow at a bottom of the geothermal piping.

* * * * *